United States Patent [19]

Schmidt et al.

[11] Patent Number: 4,775,484

[45] Date of Patent: Oct. 4, 1988

[54] METHOD AND APPARATUS FOR THE CONTINUOUS SEPARATION OF CONTAMINANTS FROM A FLUID MIXTURE

[75] Inventors: Robert N. Schmidt, Cleveland; Martin Sudar, Euclid; Daniel C. Walter, Chardon, all of Ohio

[73] Assignee: Life Systems, Inc., Cleveland, Ohio

[21] Appl. No.: 23,340

[22] Filed: Mar. 9, 1987

[51] Int. Cl.$^4$ ............................................. B01D 15/02
[52] U.S. Cl. ...................... 210/673; 55/20; 55/28; 55/76; 55/78; 55/267; 55/270; 55/316; 55/390; 55/403; 210/676; 210/677; 210/181; 210/267; 210/269
[58] Field of Search ............... 55/20, 28, 31, 34, 35, 55/48, 49, 75, 76, 78, 80, 269, 270, 316, 317, 328, 338–340, 390, 403, 267; 210/662, 663, 669, 670, 673, 676, 677, 678, 691, 692, 694, 181, 182, 184–186, 195.1, 197, 264, 266, 267, 269, 275, 284

[56] References Cited

U.S. PATENT DOCUMENTS

| | | | |
|---|---|---|---|
| 2,617,986 | 11/1952 | Miller | 183/4.6 |
| 3,197,944 | 8/1965 | Westeren et al. | 55/162 |
| 3,780,498 | 12/1973 | Wenner | 55/73 |
| 3,883,326 | 5/1975 | Wenner | 55/34 |
| 4,046,525 | 9/1977 | Matsuo et al. | 55/59 |
| 4,293,423 | 10/1981 | Kosaka et al. | 210/676 |
| 4,391,616 | 7/1983 | Imamura | 55/35 |
| 4,522,726 | 6/1985 | Berry et al. | 210/660 |
| 4,548,802 | 10/1985 | Dickey | 423/659 |
| 4,574,874 | 3/1986 | Duran | 165/43 |
| 4,589,892 | 5/1986 | Leonard | 55/162 |
| 4,595,575 | 6/1986 | Oeste et al. | 423/210 |
| 4,599,225 | 7/1986 | Dickey | 423/659 |

Primary Examiner—Ivars Cintins
Attorney, Agent, or Firm—D. Peter Hochberg; Mark M. Kusner; Walter C. Danison, Jr.

[57] ABSTRACT

A continuous and valveless sorber device is described which utilizes a novel rotating sorption bed which operates through at least three zones (sorption, desorption and cooling). The rotating sorption bed is contained within a plurality of manifolds and the sorption bed and the manifolds are sealed to one another via sealing means. Contaminated fluid is directed through the sorption zone of the rotating sorption bed where the contaminants are removed by sorbents. The bulk of the fluid which is then cleaned is available for use. A portion of the clean fluid (regeneration fluid) is used to cool the sorbent in the cooling zone of the rotating sorption bed. The warmed regeneration fluid is then heated by a regeneration heater and is subsequently directed into the desorption zone of the rotating sorption bed where the hot clean regeneration fluid is used to desorb and carry away the contaminants from the sorbent. The hot contaminated regeneration fluid, which has a reduced flow rate but a higher concentration of contaminants than the original fluid stream, may then be disposed of or processed in a suitable manner.

64 Claims, 7 Drawing Sheets

METHOD AND APPARATUS FOR THE CONTINUOUS SEPARATION OF CONTAMINANTS FROM A FLUID MIXTURE

BACKGROUND OF THE INVENTION

1. Field of the Invention

This invention generally relates to a method and apparatus for the separation of components combined in a fluid mixture. More specifically, a fluid mixture is introduced to a sorption zone of a rotating sorption bed which is contained within a plurality of manifolds. A portion of the separated fluid exiting the sorption zone of the rotating sorption bed is used to cool the sorbent in a cooling zone and subsequently heated to desorb the sorbed fluid to regenerate the sorption material for reuse. The method and apparatus of the present invention is highly effective in the removal of components from both liquids and gases and does not require the use of valves for passing the fluid from one processing zone to the next.

2. State of the Art

Fluid purifications/separations are required in many areas. Industrial chemical processing requires many separations which require the concentration of a contaminant into a smaller fluid stream. Sorption processes have long been used to purify fluid streams. Most sorption is conducted in batch processes or cyclic processes. Other continuous sorption processes such as the one described in U.S. Pat. No. 4,522,726 require large distribution valves which significantly add to the volume of the system.

Other fluid purification requirements include air purification for chemical defense. In this instance, the requirement is for the air to be cleaned of chemical warfare contaminants prior to air entering a collective protection shelter for military personnel. Presently, U.S. chemical defense is based on the use of Whetlerized activated carbon. This activated carbon is made by impregnating a coal based charcoal, which has been steam activated, with copper, chromate and silver ions dissolved in an ammonium solution. The metal ions are used to chemisorb blood agents such as cyanogen chloride (CK) and hydrogen cyanide (AC). Some of the blood agents, virtually all of the blister agents (such as distilled mustard (HD) and Lewisite (L)), and virtually all of the nerve agents (such as Sarin (GB) and Soman (GD)) are physically adsorbed in the activated carbon. A major problem with Whetlerite activated charcoal is that it is not reusable due to: (1) once a blood agent has been chemisorbed on a metallic ion, the sorption site is now filled and may not be made available to another molecule or agent and (2) the metal ions lower the ignition temperature of the activated carbon to a point where the blister and nerve agents may not be desorbed by thermal regeneration in a reasonable time without igniting the carbon. Thus, the most significant problem associated with Whetlerite is the logistic burden it places on the military supply system, due to its nonregenerability. Whetlerite filters require replacement every year (every two months in hot, humid climates) during peach time. In war time, they must be replaced before each blood agent attack and immediately after each blood agent attack.

The second major problem with Whetlerite is the loss of its CK efficacy due to high humidity and/or high temperature. In one week of aging, Whetlerite filters lose 40% of their CK life. After one year, the CK life of a Whetlerite filter may be only 25% of its initial life. Severe storage conditions can reduce the CK effective capacity of 18% of the initial CK life. In addition to the loss of CK life due to sorption of water vapor, Whetlerite filters lose capacity by sorbing other organic vapors which would be found on the battlefield. ASC/TEDA Whetlerite mitigates some of these problems but still loses capacity with exposure to humidity.

Finally, the Whetlerite canisters are dangerous to replace, particularly when they are inside a vehicle; there is no practical way to determine the residual life left in a Whetlerite filter; and the Whetlerite filters require the use of a costly impregnation process which about doubles the cost of the carbon.

To be able to ascertain the practical alternative to Whetlerite, various potential technologies have been evaluated. Catalytic oxidation, chemical decomposition, combustion, thermal decomposition, corona discharge, laser decomposition, microwave decomposition, cold trap, high pressure adsorption, membrane separation, pressure swing adsorption (PSA), temperature swing adsorption (TSA), combined PSA/TSA and regenerative closed loop life support systems were reviewed. The TSA was selected as the most viable alternative technology, as well as the most mature technology in various studies performed.

The above techniques all have various problems associated with their implementation. For example, the TSA system has a large volume requirement that would affect the size of the vehicle's cargo capacity. Also, these systems have relatively large power requirements that may interfere with the effective operation of the vehicle. Therefore, a more volume efficient, energy efficient system is required to make regenerable filtration more attractive for use on military vehicles and the like.

Other devices and methods for purifying fluid steams on a continuous basis have also been disclosed in the art. For example, U.S. Pat. No. 4,391,616 discloses a rotating canister dehumidifier that contains a carbon fiber filter and provides simultaneous radial and axial flow of air through the filter.

U.S. Pat. Nos. 3,780,498 and 3,883,320 disclose a continuous system for the removal of sulfur oxides from waste gas steams. This system contains two rotating beds where one bed serves as a heat exchanger to recover the useful heat from the waste gas stream and a second rotating bed serves to effect the removal of sulfur oxides from the gas stream.

In U.S. Pat. No. 2,617,986, an apparatus for treating liquids or gases is disclosed that comprises a rotatable annular drum containing conical baffles and tapered passageways.

U.S. Pat. No. 3,197,944 discloses a rotary absorber for gases, particularly nitrogen. While a rotary device is disclosed, the movement is intermittent as opposed to continuous.

U.S. Pat. No. 4,046,525 discloses a method for separating harmful components from a fluid steam which comprises at least two adsorptive units. Both units contain a plurality of cylindrical or bag-shaped adsorptive elements that are made of a cloth-like or sheet-like adsorptive material. Desoprtion is achieved by a heated purging gas jetting device.

U.S. Pat. No. 4,522,726, a liquid separation system is disclosed. Discrete fluid steams are introduced into individual treatment sections of the disclosed device where fluid flow is in both directions.

U.S. Pat. No. 4,595,575 discloses the chemisorption of gaseous pollutants Pollutants are washed out by a technique where the waste gas passes through the bed in codirectional or counter current flow to the wash liquid.

U.S. Pat. No. 4,574,874 discloses a chemisorption thermosystem that provides a cooling output by revolving an array of thermal elements through heat sink and heat source temperature zones. This system is disclosed as being useful for a vehicle air conditioning system.

U.S. Pat. No. 4,589,892 discloses a dehumidifying apparatus that includes a sequenced fed carousel containing a plurality of axial modular desiccant beds.

U.S. Pat. Nos. 4,548,802 and 4,599,225 disclose continuous flow separation apparatus that includes alternating sorption and desorption zones.

It would nevertheless be desirable if the regeneration air desorption of a particular sorption material utilized in a purification system would not require a separate clean stream source for this regeneration. Furthermore, it would be highly desirable for the sorption material to have a relatively long life time even though it is in continuous operation. It would furthermore be advantageous if the system would operate not only on a continuous basis, but could do so without frequent interchange of critical elements, e.g., without interchange of used sorption material and the like. None of the foregoing disclosures teach nor suggest such a device or system.

SUMMARY OF THE INVENTION

A novel method and system for the continuous separation of components contained within a fluid mixture that does not require frequent interchange of critical elements and integrates the regeneration of the sorption material in the system without introducing a separate clean fluid source has been discovered.

In accordance with the present invention, there has been devised an efficient and effective separation system that is useful for both liquids and gases, which may provide for the continuous removal of contaminants contained within the liquid or gas and simultaneously provide the continuous regeneration of the separation medium.

Further in accordance with the present invention, the system of the present invention is adaptable for use on an industrial, commercial, residential scale or for use in motor vehicles, sea going vessels, air craft or spacecraft.

Still further in accordance with the present invention, the system is adaptable such that the fluid flow may be axial or radially through the separation or sorption material and does not require the use of valves to allow for the passage of the fluid from one processing zone to another processing zone of the system.

Still further in accordance with the present invention, the system may be operated on a continuous basis while exhibiting freedom from plugging and thus, the system does not rely on the need for the frequent interchange of critical parts, such as the sorption material during operation.

Still further in accordance with the present invention, the sorption bed may contain multiple sorbent materials. For example, the sorbents may be homogeneously mixed prior to placing in the bed or separate sorbents may be stratified in the bed.

Still further in accordance with the present invention, a continuous sorber device for separating components of fluid mixtures is provided comprising:

(a) at least one rotatable sorption bed comprising at least one sorption material;

(b) at least three processing zones wherein said three processing zones comprise:

(1) a sorption zone;

(2) a cooling zone; and, (3) a desorption zone;

(c) fluid inlet means communicating with said sorption beds;

(d) a first manifold communicating with said sorption bed, said manifold having separate compartments comprising means for each of said processing zones for passing fluid from one processing zone to the next;

(e) a second manifold communicating with said sorption bed on the side opposite to said first manifold, and said second manifold having separate compartments, said compartments comprising means for each of said processing zones for passing fluid from one processing zone to the next;

(f) sealing means between said sorption bed and each of said first and second manifolds for sealing each of said manifold compartments to prevent fluid flow into other compartments through and around said sorption material to another of said processing zones;

(g) fluid outlet means communicating with said sorption bed for removal of fluid separated from said components, wherein a regeneration portion of said separated fluid is diverted to pass through the remaining processing zones of said bed;

(h) heater means communicating with said sorption bed to heat said regeneration portion of separated fluid to desorb and regenerate said sorption material; and, (i) drive means for said rotatable sorption bed.

Still further in accordance with the present invention, a method for the continuous separation of components from a fluid mixture is provided comprising:

(a) introducing said fluid mixture into a sorption zone of a rotating sorption bed comprising sorption materials;

(b) withdrawing separated fluid from said sorption zone into an outlet means wherein a regeneration portion of said separated fluid is diverted into a cooling zone of said rotating sorption bed;

(c) said regeneration portion of separated fluid exits said cooling zone, enters regeneration heating means and is heated to the regeneration temperature of said sorption material; and, (d) said heated regeneration portion of separated fluid is introduced to a desorption zone of said rotating bed to regenerate said sorption material.

These and other aspects of the invention will become clear to those skilled in the art upon the reading and understanding of the specification.

BRIEF DESCRIPTION OF THE DRAWINGS

The present disclosure includes nine attached drawings so that the reader may more readily comprehend the present invention by examining the drawing figure in connection with the detailed description thereof.

The invention will be further described in connection with the attached drawing figures showing preferred embodiments of the invention including specific parts and arrangements of parts. It is intended that the drawings included as a part of this specification be illustrative of the preferred embodiments of the invention and should in no way be considered as a limitation on the scope of the invention.

DETAILED DESCRIPTION OF THE PREFERRED EMBODIMENTS

A highly efficient and effective system for the separation of components from a fluid mixture, which operates on a continuous basis but without the need for frequent interchange of critical elements, e.g., without the interchange of used separation media and the like, has been developed. The sorption material is continuously desorbed, i.e., regenerated, while the system is operating, thus providing a long life sorption bed.

The terms "separation media", "sorption means" or "sorption material" as used herein, refer to those media or material that will adsorb or absorb, i.e., separate, components contained within a fluid mixture Such media or materials are generally solid materials that are capable of separating, e.g., entrained, dissolved, suspended an/or mixed components in a liquid or gas. For example, ion exchange resins are useful for the separation of various dissolved ions in water or other liquids as well as polarized suspended or dispersed components that may be contained within the liquid or water. The particular sorption media or materials used in the method an apparatus of the present invention is not particularly critical only that it is capable of separating the desired components from the particular fluid stream to be treated Thus, semi-solids, e.g., silica gels, and the like as well as solid sorption materials may be useful as the sorption media or materials within the scope of the invention.

As discussed above, the method and apparatus of the present invention has been designed to operate on a continuous basis, i.e., the sorption materials are continuously regenerated to allow for the continuous separation, i.e., sorption, of the components from the treated fluid mixture. This is accomplished by utilizing a portion of the clean stream or separated fluid exiting a sorption zone of the system to desorb the sorption material and regenerate this material for further sorption. As discussed above, a number of systems have been disclosed in the art that utilize a countercurrent or codirectional fluid stream to regenerate the particular sorption material. However, these systems require a second or additional source for the clean fluid to act as the regeneration fluid, i.e., these systems do not utilize a portion of the treated fluid as the regeneration fluid.

According to the present invention, a fluid mixture to be treated is introduced into a sorption zone by inlet means for the removal or separation of the undesired components in the fluid. The thus treated fluid exiting the sorption zone is passed through an outlet means of the apparatus that diverts a regeneration portion of the separated fluid to pass onto the remaining processing zones. The regeneration portion of separated fluid may be diverted by any device or design that create sufficient motive force for a portion of the clean or separated fluid to pass into the remaining processing zones of the apparatus. Such a design may be a restriction element such as a baffle or adjustable or fixed aperture in the apparatus outlet means. Alternatively, a pump, blower, compressor or equivalent device may be utilized to force a regeneration portion of the separated fluid into the other processing zones.

The regeneration portion of the seperated fluid passes into the cooling zone where the hot sorption material or sorbent is cooled to or near the sorption temperature. The warmed regeneration portion of the separated or clean fluid is then further heated by a regeneration heater and introduced to a zone of the sorption material for desorption of the components originally sorbed. The regeneration portion of the separated fluid exiting the desorption zone, which contains a high concentration of the sorbed components, may then be disposed of or treated in some other manner, e.g., burned, further concentrated, or subjected to some other subsequent treatment or disposal.

The apparatus designed for the above described method comprises a single sorption bed having at least three processing zones, containing a sorption material, i.e., sorbent, and a drive means for rotating the bed. Obviously, the preferred design for the bed is circular, however, the bed could potentially take the shape of a hexagon, octagon and the like as this is not a critical feature of the invention. The bed may be structured such that it is divided according to the number of zones, e.g., if there are three zones then the bed may be structured to have three segments. However, it is preferred that the bed is subdivided into numerous segments by various segment dividers that will contain the particular sorbent material. If the particular sorbent material is a solid or semi-solid particulate, retainer screens may be utilized to hold and contain the sorbent material. However, the sorbent material may be a porous, solid monolithic block which may be held in the bed by pin means or the like and sealed to the rotating sorption bed to prevent fluid by-passing.

The above described sorption bed is sealed between at least two manifolds. A first manifold communicates with one side of the bed and a second manifold communicates with the opposite side of the bed. Depending upon the particular structure and arrangement of the manifold and sealing means with respect to the bed, the flow of the fluid may be axial or radial.

The manifolds are subdivided into compartments corresponding to each of the zones of the sorption bed. The manifolds will contain inlet and outlet ports to allow the passage of fluid from one zone to the next as well as in and out of the apparatus. Different compartments of the manifold will be sealed by sealing means so as to not allow the fluid to pass through the sorption material of the bed into an adjacent zone or between adjacent compartments.

The sealing means is preferably a polymer material and most preferably a heat stable elastomer, e.g., a KALRZ TM or VITON TM elastomer. However, various silicon based polymers, acrylonitrile type rubbers and plyamide-imide type polymers may also be utilized.

If the apparatus of the present invention is adapted to treat gaseous mixture, the apparatus may also contain a gas conditioning means. Such means may comprise a dust separator which may be any conventional fiber filter or other known type of dust removal device, e.g., any spin tube separator. If a spin tube separator is selected, the dust collected may be removed from the separator by a dust scavenge blower or other conventional ejector or vacuum device. A compressor or blower may also be used in conjunction with the gas conditioning means to place a positive pressure on the gas in order to force the gas through the remainder of the system. If the compressor or blower is located upstream of the spin tube separator, the need for a dust scavenge blower may be eliminated. The gas conditioning means may also include aerosol/particulate filter to remove submicron particles, e.g., radioactive dust and microorganisms. The thus treated incoming gas may then be passed into a cooler means to reduce the temperature of the gas which, in turn, will increase the capacity of the sorption material which will function on a lower temperature isotherm and thus reduce the volume requirement of the sorption material. An air temperature sensing means may communicate with the cooling means to control the amount of coolant entering the cooling means and thus allowing for the control of the temperature of the gas entering the sorption zone of the sorption bed. A water separation means may also be incorporated downstream from the cooling means depending on the operating conditions required for the particular gas being treated, e.g., the dew point of the particular ambient gas and the cooler outlet temperature.

The above-described sealing means, gas conditioning means, i.e., compressors, aerosol/particulate filter, cooling means, and water separation means, are available from commercial suppliers. Those skilled in the art will be capable of selecting those elements and units necessary for the particular fluid streams to be treated. The apparatus according to the present invention may also contain other such units and elements necessary for its operation. For example, a control/monitor instrumentation box may be required for the purpose of controlling/monitoring the electronics of the apparatus. Also, the sorption bed contained within the plurality of manifolds may contain insulation for temperature control, heat loss and the like. The drive device for the sorption bed is preferably an electric motor containing a drive wheel and a drive belt.

As pointed out previously, an advantage of the method and apparatus according to the present invention is that it may be adapted to treat a wide variety of fluid streams. It is particularly useful for treating gas streams and more specifically, air. The apparatus may be useful in an industrial complex or metropolitan environment to remove or pollutants and/or chemical contaminants contained within the air. It may also have a highly beneficial use during wartime to remove chemical warfare agents from an airstream. In other words, the system according to the present invention may be useful to remove any component or agent toxic, harmful, or otherwise unpleasant to humans, the environment or to industrial processes. As may readily recognized by those skilled in the art, the apparatus may be scaled up for use in a building or building complex. The building may be a single family home or a factory or a government building or shelter. Conversely, the apparatus according to the present invention may be scaled down for use in a motor vehicle such as an automobile or a military vehicle, e.g., tank, aircraft, spacecraft or naval vessel.

The device may be utilized to clean any liquid or gas containing contaminants, which can be sorbed, but it is most beneficial where volume requirements are a critical consideration. For example, the device may be utilized to purify water or petrochemical streams by using an ion exchange resin as a sorbent. A weak base or a weak acid resin may be regenerated by a hot fluid stream. Air streams may be purified of carbon dioxide by using a solid amine sorbent. Other liquids or gases may be cleaned by selecting a sorbent which is suitable for the fluid and the contaminant.

The flexibility of the system of the present invention allows for its adaption to treatment of liquid streams such as water, or organics. For example, it may be used to treat a waste stream exiting a factory or plant, or water entering a single family house. This flexibility, of course, is dependent upon the material selected to construct the manifold and the bed as well as the selection of the particular sorption material. For example, ion exchange resins, such as hydrolyzed chloromethylated styrene-butadliene rubber and the like and/or activated carbon may be used to treat water entering a home. Whereas various clay materials, diatomaceous earth and/or sand may be used for treating water used for swimming pools or for treating various organic liquids.

Generally, sorbent materials used with the present invention may include activated carbons, zeolites, molecular sieves, silica gels and other gels, alumina, Fuller's Earth, ion exchange resins, metal hydrides, metal oxides, metal carbonates and other adsorptive or absorptive materials.

All of these, and other sorptive materials can be used in various sizes and forms. They may be used in their commerically available forms, placed on a various substrates, or mixed with various binders to form various particle sizes and shapes, such as pellets, granules, powders, sheets, or monolithic blocks (e.g., honeycombs, porous blocks, and the like). To provide a more effective broad range contaminant removal sorbent, sorbents may be impregnated with various catalysts or metallic ions and the like.

Figure 1:
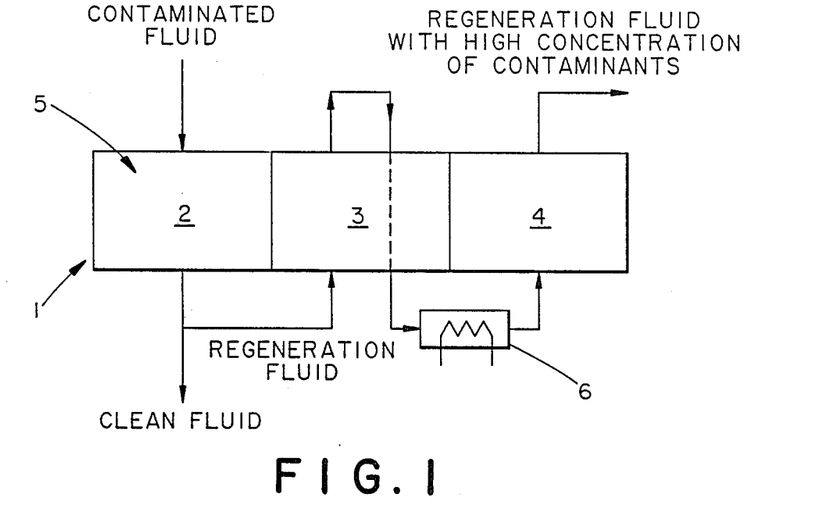
FIG. 1 is a schematic of the continuous sorber process.

Referring to the figures, the rotating sorption bed 1 shown in FIG. 1 rotates through at least three zones. They are the sorption zone 2, a cooling zone 3 and an adsorption zone 4. The contaminated fluid flows through the sorption zone 2 where the sorbent 5 adsorbs or absorbs the contaminants from the contaminated fluid. A clean fluid then exits the other side of the rotating sorption bed from the sorption zone. A portion of the clean fluid is used as a regeneration fluid to clean the sorption bed. It is first directed through the cooling zone 3 where the hot sorbent is cooled down to or near the sorption temperature. The now warmed regeneration fluid is then heated in the regeneration heater 6 and directed to the desorption zone 4 where the sorbent is heated to a temperature where it desorbs the contaminants. The regeneration fluid then exits the device with a high concentration of the contaminants.

Figure 2:
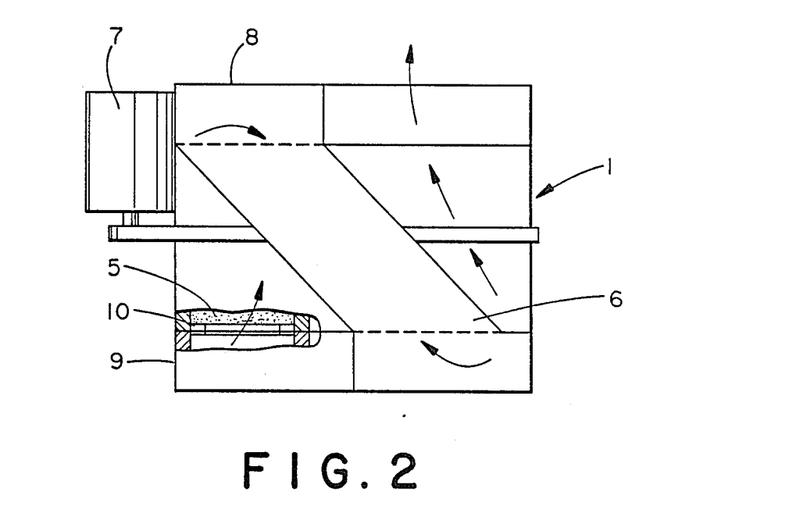
FIG. 2 is a drawing of the continuous sorber device in its simplest embodiment.

FIG. 2 shows a drawing of the continuous sorber device in its simplest form. It shows the device looking at the cooling and desorption zones. A drive device 7 is utilized to rotate the rotating bed 1. The rotating sorption bed is sealed between the first and second manifolds 8, 9 by means of a sealing device 10. After the contaminated fluid is directed through the sorption zone, a portion of the clean fluid then enters the cooling zone where it cools the previously regenerated (desorbed) sorbent 5. The arrows show the fluid flow. The regeneration heater 6 further heats the warmed, clean regeneration fluid to the regeneration temperature. One of the manifolds then directs the hot regeneration fluid to the desorption zone. The fluid flow may pass through the rotating sorption bed in any direction; however, it is desirable to have the cooling and regeneration flow in the opposite direction of the sorption flow. This assures that the sorption bed outlet in the sorption zone contains the coolest, cleanest sorbent; thus, decreasing the chance of a contaminant breakthrough into the clean fluid.

Figure 3:
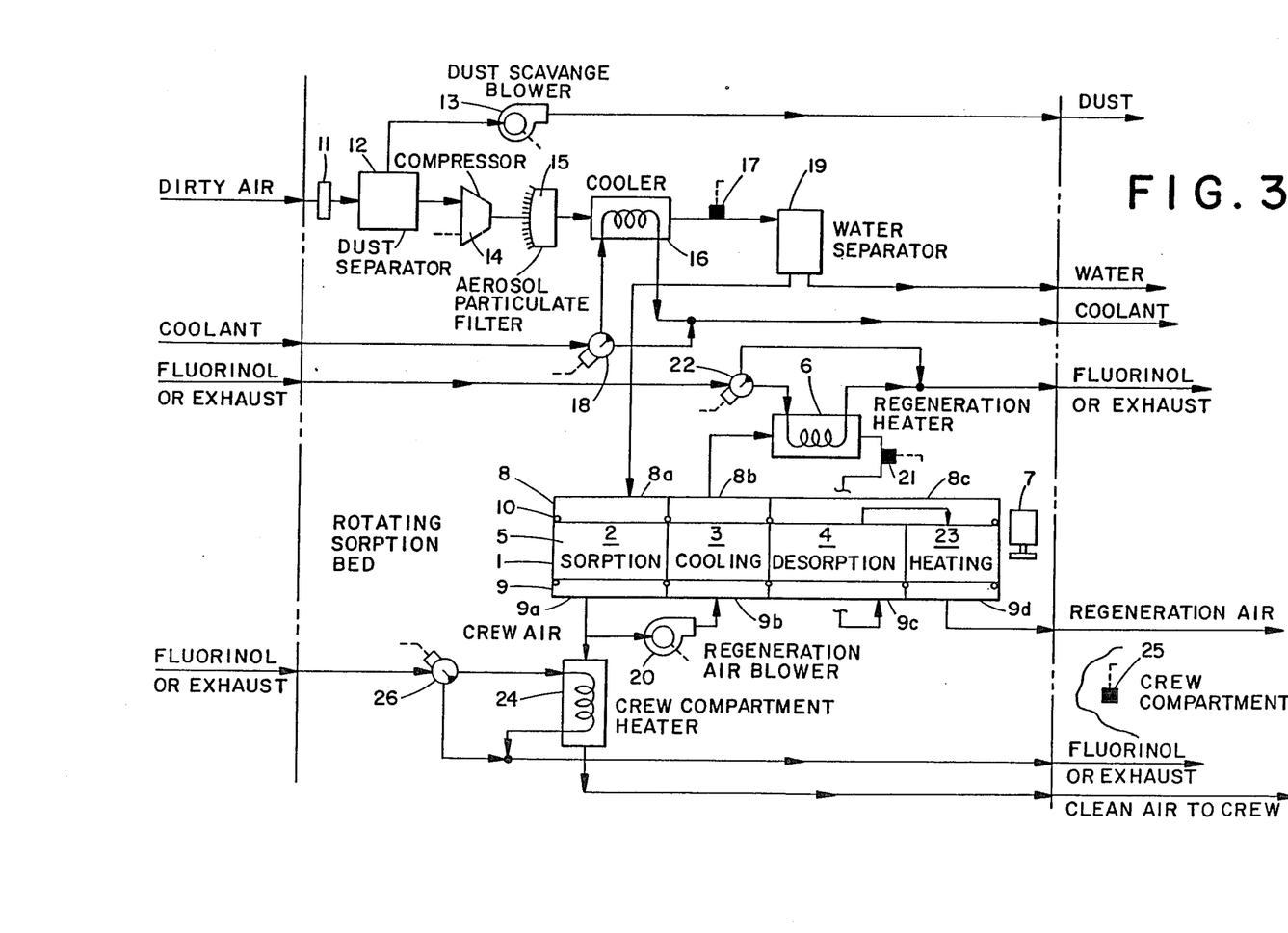
FIG. 3 is a schematic of a Continuous Adsorber Air Purification System (CAAPS).

FIG. 3 shows a schematic of a Continuous Absorber Air Purification System (CAAPS). This is an application of the continuous sorber device of the present invention for the removal of chemical warfare agents from the air. This system is preferably used in armored vehicles and other collective protection enclosures. Contaminated air is taken in through an air intake 11 into a dust separator 12. The dust separator 12 may be an impaction fiber filter or any other type of dust removal device; but for the lowest maintenance applications as inertial spin tube separator may be used. Dust may be removed from the spin tube separator by using a dust scavenge blower 13, or other ejector or vacuum device. A compressor 14 pressurized the air to provide the motive force for the remainder of the system. The compressor may be located upstream of the dust separator, thus eliminating the requirement for a dust scavenge blower, but this generally reduces the compressor's life. An aerosol/particulate filter 15 removes submicron particles such as radioactive dusts and microorganisms, e.g., bacteria and rickettsia. A cooler 16 reduces the temperature of the incoming air to increase the efficacy of the sorbent which operates at an increased sorption capacity on a lower temperature isotherm. The temperature of the cooled contaminated air is controlled by the cooled air temperature sensor 17 which controls the amount of coolant entering the cooler 16 by opening or closing the coolant valve 18. Any coolant such as freon or cool water may be utilized. An air cycle cooling system may also be used in lieu of the cooling system shown in the figure.

Depending upon the dew point of the ambient air, water may form in the cooler. Since water tends to block the pores of sorbents and displace previously sorbed blood agents, and thus reducing the sorption capacity of the sorbent, a water separator 19 is placed downstream of the cooler. This water separator may be of any type but a membrane water separator or a coalescing water separator using preferably borosilicate fibers has been found to be effective. The cooled contaminated air is then ready to enter the continuous sorber device.

The cooled contaminated air which has had the bulk of the liquid water removed then enters the first manifold 8 into the sorption zone inlet manifold 8a. The air flow passes the sealing device 10 into the sorption zone 2 of the rotating sorption bed 1. The sorbent 5 physically adsorbs the chemical warfare gases. As previously discussed, any sorbent may be utilized. However, activated carbons such as Calgon's BPL have been used most extensively and proven to be effective. Silica gels, molecular sieves and other zeolites such as pillard interlayered clays have also been tested for removing chemical warfare agents from air. Activated carbon is the most preferred sorbent in that it has a diversity of pore sizes allowing good sorption and retention of the various sizes, polarities, and vapor pressures of the harmful agents in war gases. A good distribution of macropores and micropores also allows for rapid diffusion of the gases.

The chemical warfare agents are adsorbed on the sorbent 5 allowing the clean air to pass through the rotating sorption bed 1 past the sealing device 10 into the sorption zone outlet manifold 9a. Preferably, three to fifty percent of the clean air and most preferably between 5% and 30% regeneration portion of the clean air is then directed to the cooling zone 3 of the bed. The motive force may be provided by putting a restriction in the clean air to crew outlet line sufficiently pressurizing the regeneration air stream. To reduce the system power requirement which would otherwise necessitate a larger compressor 14, but at the cost of slightly reduced reliability and a slightly increased volume, a regeneration air blower 20 may be included in the system. This provides additional pressure to provide the motive force t push the air through the other zones of the rotating sorption bed 1. The air enters the cooling zone inlet manifold 9b. This manifold compartment may be either in the first or second manifold 8, or 9, respectively but is preferentially in the second manifold to have the cooling air flow counter-current to the sorption air. The air flows past the sealing device 10 into the cooling zone 3 of the rotating sorption bed 1. The air then exits the cooling zone outlet manifold 8b and enters the regeneration heater 6. The air may be heated by any hot fluid such as engine exhaust or a hot heat exchange fluid such as fluorinol. An electric for fuel fired heater may also be used. The outlet temperature of the regeneration heater is measured by a regeneration air temperature sensor 21 which controls the electric or fuel fired heater or the regeneration heater temperature control valve 22. Alternatively, the temperature may be controlled by including a control valve on the regeneration fluid line and thus allowing some of the fluid to by-pass the regeneration heater 6. The hot clean air then enters the desorption zone inlet manifold 9c. Again, it is preferable to have the desorption air flow countercurrent to the sorption air flow. This assures that the sorption zone bed outlet is the cleanest portion of the bed, thus increasing the safety of the crew. To be able to recover the heat of the air exiting the desorption zone, a fourth zone, i.e., a heating zone, may be added to the process. This heating zone 23 heats the sorbent and starts to desorb the low molecular weight chemical warfare agents and the water which are sorbed on the sorbent. In addition to increasing the thermal efficiency, including the heating zone gives the advantage of decreasing the outlet air temperature which decreases the infrared observables which is particularly important for military vehicles. In the heating zone 23, it may not be particularly important in which direction the air flows depending on the adsorbent and the contaminant. For this reason, the desorption zone outlet manifold 8c also acts as the heating zone inlet manifold. The cooled contaminated air then flows out of the heating zone 23 into the heating zone outlet manifold 9d and out of the system into the ambient air, to the armored vehicle's main engine air inlet, or to another location. By utilizing the regeneration air as engine combustion air, the chemical warfare agents are combusted and the overall concentration in the ambient environment is reduced.

The rotating sorption bed 1 is driven by a drive device 7. This may be an electric motor, a hydraulic or pneumatic motor, a small turbine, a direct mechanical drive or other equivalent device.

The clean air from the sorption zone which is not used as regeneration air may be directed to a crew compartment heater 24 where it is warmed to the temperature desired by the crew and controlled by the crew compartment thermostat 25. The crew compartment thermostat controls a crew heater temperature control valve 26 which controls the amount of exhaust air, fluorinol, or other heating fluid into the crew compartment heater. The temperature control valve may control the amount of crew air by-passing the crew compartment heater 24 in lieu of controlling the heating fluid. Alternatively, an electric crew compartment heater or fuel fired heater may be utilized in which case the crew compartment thermostat 25 controls the electrical energy or fuel input into the crew compartment heater. The clean dehumidified temperature controlled air is then available to the crew of the military vehicle or to the occupants of the collective protection shelter.

There are many alternatives to this scheme which embody the intent of the invention. One such alternative would be to relocate the aerosol/particulate filter 15 to just upstream or just downstream of the crew compartment heater 24. This may provide sufficient back pressure to the system to allow the elimination of the regeneration air blower 20. This makes the pressure in the sorption zone 2 the highest in the rotating sorption bed 1; thus, if there are any leaks in the seals around the sorption zone, the air will leak outward from the sorption zone, and thus preventing contaminated air from entering the sorption zone clean air stream which would be hazardous to the occupants of the crew compartment. It also eliminates the reliability problem of the regeneration air blower 20. This modification also has the advantages of extending the aerosol/particulate filter 15 life by not requiring the filtration of micron size and submicron particulate matter of the regeneration air. An additional advantage of having the aerosol/particulate filter downstream of the sorption zone is that it may trap any of the sorbent fines, which may be created by vibration of the CAAPS system, from entering into the crew compartment. It has the disadvantage of allowing particulate matter to accumulate in the cooler 16, water separator 19, rotating sorption bed 1, and regeneration heater 6. This translates to the disadvantage of decreasing the efficiencies of the cooler and regeneration heater, decreasing the life of the water separator, and allowing some particulate matter to build up on the rotating sorption bed. However, some of this particulate matter in the rotation sorption bed will be removed during the countercurrent flows experienced in the cooling and desorption zones. It also has the disadvantage of allowing a varying flow rate to the crew as particulates build up on the aerosol/particulate filter, and in turn, increasing the pressure drop on the aerosol/particulate filter, which will increase the regeneration air flow and decrease the flow of clean air to the crew.

Many other alternative and equivalent flow schemes which embody the basic intent of the continuous sorber device may also be derived by the reader from this description.

The system may also be conveniently used for other applications such as concentrating air streams in a demilitarization plant for demilitarizing outmoded chemical agent artillery shells. These plants have large Whetlerite filter banks which are used to filter the air in the working areas and collect any agents which may have been released into the air of the working areas during abnormal or extraordinary operations (spills). These filters retard the release of agents and allow the agents to be released at low levels over long periods of time. They do not destroy the blister and nerve agents. Another air purification system which utilizes the continuous sorber device may be used to concentrate any agents spills into an air stream which is small enough to be used as the primary air stream for the combustion furnaces which burn the agents from the chemical warfare shells. This application may not require the need for a dust separator, aerosol/particulate filter, cooler and water separator. The system has the additional advantage in that it does not require the extensive replacement and burial of the carbon which has the disadvantage of converting an air pollution problem to a solid waste disposal problem. Burying contaminated carbon also has the risk of contaminating the ground water. Thus the continuous sorber device may solve several problems in the demilitarization of outmoded chemical warfare shells.

Figure 4:
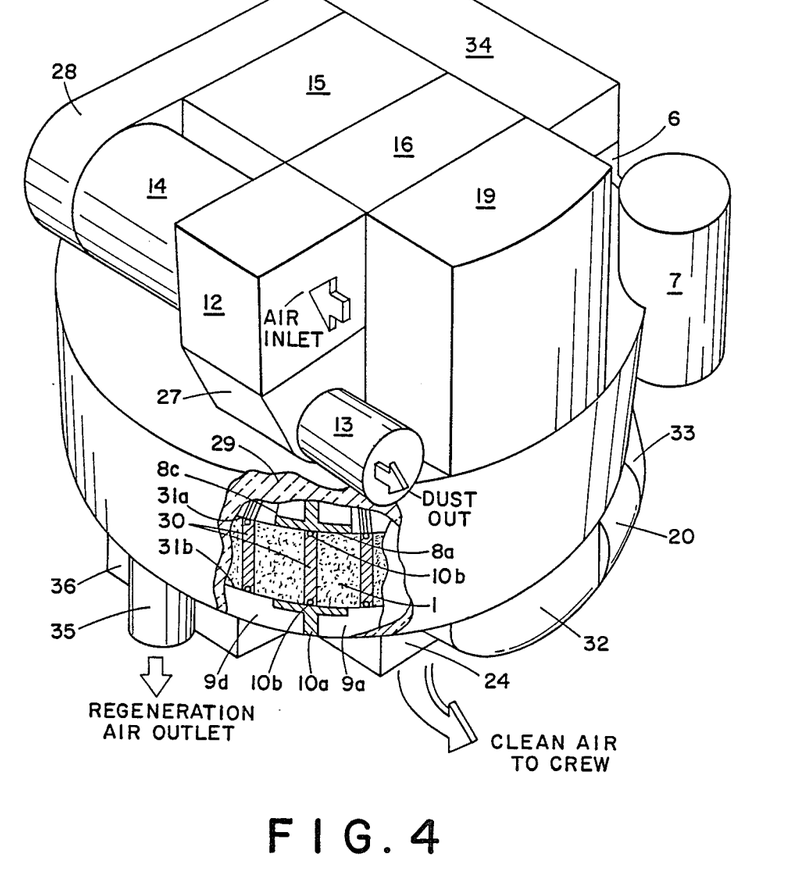
FIG. 4 is a drawing of an axial flow CAAPS device.

FIG. 4 shows one configuration of the CAAPS device which utilizes the schematic shown in FIG. 3. The device contains a dust separator 12 which rejects dust through the dust duct 27 and out through the dust scavenge blower 13. The air intake is part of the vehicle or shelter and is not shown in the figure. The compressor 14 pushes the air into the compressor outlet duct 28 through the aerosol/particulate filter 15, cooler 16, water separator 19, and down into the rotating sorption bed 1. The cross-section of the manifold/rotating sorption bed structure is shown in the cutaway section. Insulation 29 reduces heat flow from the manifolds 8a, 8c, 9a, 9d. Also shown in the cutaway view are details of one potential sealing device. The rotating sorption bed must be divided into at least the same number of segments as zones are used, the zones must be of equal size. However, if numerous small segments are used, each zone may be optimized in size according to its thermodynamic design parameters. This will depend upon the inlet concentration of chemical warfare agents, design ambient temperatures, design ambient relative humidities, construction materials, amount and type of insulation, and the selection of sorbent.

If the number of zones and rotating sorption bed segments is the same, the rotating sorption bed must be rotated in an indexing fashion where each segment rapidly rotates to the next zone and stays in that zone for a fixed amount of time, or until contaminant breakthrough is detected, when the rotating sorption bed is then rotated to the subsequent zone.

If the rotating sorption bed is subdivided into numerous small segments, the bed may be indexed in small steps, perhaps one segment at a time. It may also be operated in a continuous manner by utilizing sealing zones between the manifold compartments. As shown in FIG. 4, these sealing zones 10a separate the manifold compartments (the sorption zone inlet manifold 8a from the desorption zone outlet manifold 8c and the sorption zone outlet manifold 9a from the heating zone outlet manifold 9d as shown in the cutaway view) and may also be utilized as structural members. A seal 10b may be inserted at the inlet and outlet ends of the rotating sorption bed segment dividers 30 and used to seal the rotating sorption bed to the manifolds' sealing zones 10a thus preventing fluid from flowing from one manifold compartment to another. The seals 10b may be made of any suitable material. Fluoroelastomers have the advantage of providing resiliency over a broad range of operating temperatures with high chemical resistance. Fluoroelastomers such as VITON TM and KALREZ TM are generally considered to be the most preferred. A superior material for temperature and chemical compatibility may be a poly(amide-imide) such as TORLON TM 7130. However, the TORLON TM is not elastic like the fluoroelastomers.

The sealing zones 10a must be at least as wide as the distance between seals 10b of the two adjacent rotating sorption bed segment dividers 30 so that air will not flow from one manifold through the sorbent into another compartment of that manifold or into the wrong compartment of the other manifold. This allows the rotating sorption bed to rotate in a continuous manner, thus eliminating the positioning problems associating with stopping the rotating sorption bed in an indexing motion. The small segments have the advantage of increasing the L/D ratio which improves the diffusion of the chemical warfare agents which increases the overall dynamic sorption capacity of the sorbent. Also, by having numerous small rotating sorption bed segments, fresh sorbent is continually introduced into the sorption zone which reduces the probability of chemical warfare agent high concentration breakthrough. Another advantage of a large number of rotating sorption bed segments is that the time in each zone may be optimized. For example, for a cycle time of 88 minutes rotating at 0.0114 rpm, and 44 rotating sorption bed segments, the sorption zone may be optimized for 10 segments giving a 20 minute sorption period. The heating zone requires the most residence time to allow for the removal of the bulk of the sorbed water vapor so that 12 segments may be utilized for a time of 24 minutes. An optimized regeneration zone would require 18 minutes with 9 segments. The cooling zone would also require 18 minutes with 9 segments. The four sealing zones require one segment each.

The sorbent 5 is retained within the rotating sorption bed segments by a first and second sorbent retainer screen 31a, 31b.

The rotating sorption bed is driven by a drive device 7. An electric motor will most frequently be the most practical device to be used for this application.

The crew compartment heater 24 may be conveniently located immediately underneath the sorption zone outlet manifold 9c. Adjacent to and outboard of the crew compartment heater is the regeneration air blower 20 and the regeneration air blower inlet and outlet ducts 32, 33. The regeneration heater 6 is most conveniently located immediately above the cooling zone outlet manifold. A regeneration heater outlet duct 34 is used to direct the hot regeneration air to the underside of the desorption zone into the desorption zone inlet manifold. A regeneration air outlet duct 35 is utilized to carry the regeneration air out of the CAAPS. Signal conditioning for the sensors and motor operated valve controllers is performed in the control/monitor instrumentation box 36 which is located under and in the interior of the axial flow CAAPS.

Figure 5:
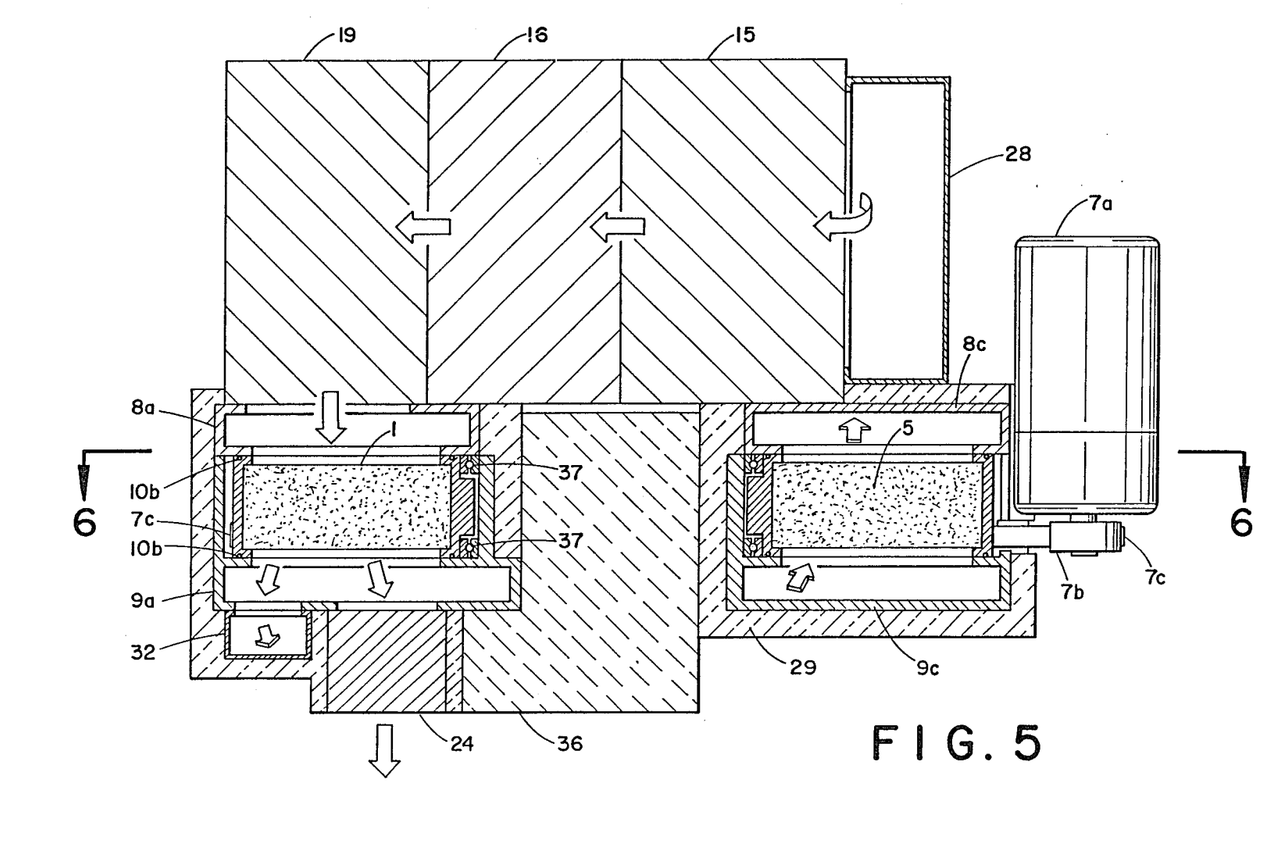
FIG. 5 is a general cross-section of the axial flow CAAPS device. It shows the side view.

FIG. 5 shows a side view of the general cross-section of the axial flow CAAPS device. The arrows in FIG. 5 show the direction of the flow of air.

The compressor outlet duct 28, aerosol/particulate filter 15, cooler 16, water separator 19, sorption zone inlet manifold 8a, rotating sorption bed 1, sorption zone outlet manifold 9a, seals 10b, regeneration air blower inlet duct 32, crew compartment heater 24, control/monitor instrumentation box 36, insulation 29, desorption zone inlet manifold 9c, sorbent 5, and the desorption zone outlet manifold 8c are all shown. The bearings 37 support the weight of the rotating sorption bed 1, keep the rotating sorption bed 1 from jumping up when the vehicle goes over large bumps, and provides horizontal stability for the rotating sorption bed when the bed is being pulled to one side by the drive belt, 7c.

The drive device electric motor 7a is shown out of position. Also shown is the drive wheel 7b and a drive belt 7c. The drive belt may drive the rotating sorption bed 1 by solely utilizing friction. Alternatively, a timing belt may be utilized which would require cogs on the belt and on the exterior perimeter of the rotating sorption bed 1. However, this type of drive requires additional volume on the perimeter of the rotating sorption bed which will increase the overall volume of the device. Another alternative would be to utilize a flat band pin drive belt which has a flat band belt with periodic holes which encircle drive pins extending from the exterior perimeter of the rotating sorption bed 1.

Figure 6:
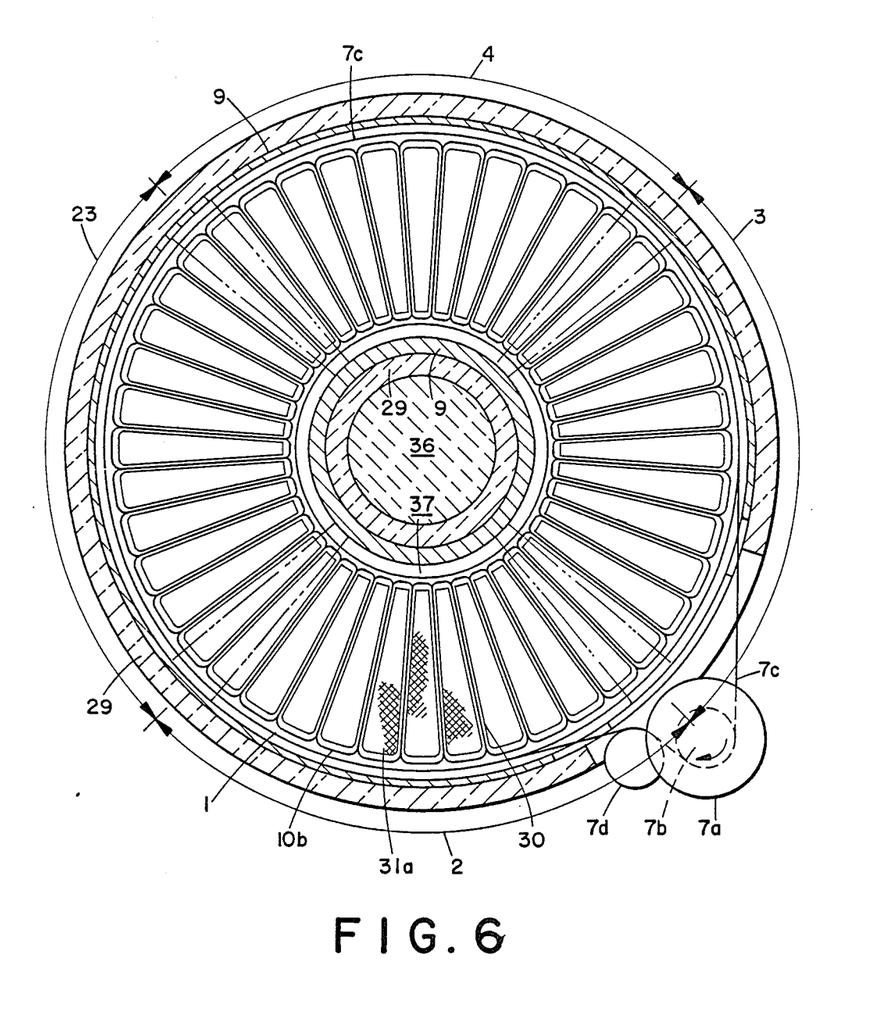
FIG. 6 is a top view cross-section of the axial flow CAAPS device.

FIG. 6 shows a top view of cross-section A—A of the axial flow CAAPS device shown in FIG. 5.

FIG. 6 shows the rotation of the sorption bed 1 through the four processing zones, sorption 2, heating 23, desorption 4, and cooling 3. It is driven by the drive motor 7a which turns the drive wheel 7b pulling the drive belt 7c which is held taut by the drive idler 7d. The figure also shows the seals 10b as they sit on the top of the rotating sorption bed and seal the inside circumference, the outside circumference, and the rotating sorption bed segment dividers 30. Also shown on the drawing is the insulation 29, the second manifold 9 extendsion wall which forms a housing for the rotating sorption bed, the bearings 37, and the control/monitor instrumentation 36. The top of the rotating sorption bed utilizes a first sorbent retainer screen 31a to keep granular sorbent in place. The screen may be eliminated where an immobilized bed sorbent is utilized. An immobilized bed may be composed of granular activated carbon which is held in place by melting small particles of sorbent resin and allowing them to cool thus forming a porous monolithic block of resin and carbon which may be held in place with pins and an edge sealant, and thus eliminating the need for the screen 31a. Many other techniques for making an immobilized bed are also possible and contemplates within the scope of the present invention.

Figure 7:
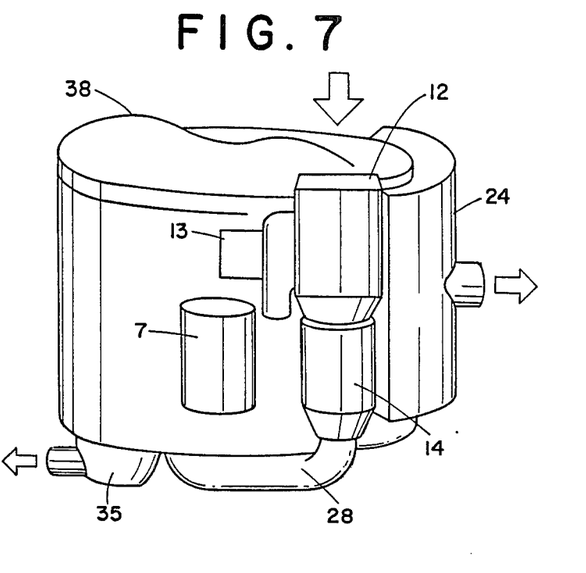
FIG. 7 is a drawing of a radial flow CAAPS device.

FIG. 7 shows an alternative configuration for the CAAPS device utilizing radial flow. The air enters the dust separator 12 and the dust is extracted by the dust scavenge blower 13. The compressor 14 pressurizes the air and blows it through the CAAPS device. The drive device 7 is shown in the center of the figure. The major difference between the radial flow device and the axial flow device is that the air flows through the sorbent in a radial direction rather than axially through the sorbent segments. The crew compartment heater 24, regeneration air outlet duct 35, the compressor outlet duct 28, and the desorption zone outlet duct 38 are also shown.

Figure 8:
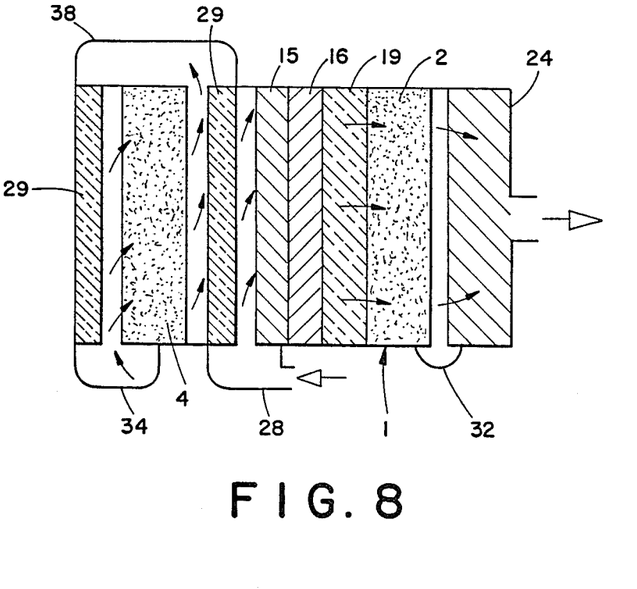
FIG. 8 is a cross-section schematic of a radial flow CAAPS device.

FIG. 8 shows a cross-section schematic of the radical flow APS. The air comes in through the compressor outlet duct 28 and into the aerosol/particulate filter 15. It then proceeds to the cooler 16 and the water separator 19 into the sorption zone 2 of the rotating sorption bed 1. Most of the air then flows into the crew compartment heater 24 and is then available to the crew. A portion of the air goes into the regeneration air blower inlet duct 32 which directs the regeneration air to the regeneration air blower and then to the cooling zone. Insulation 29 separates the inlet air from the hot desorption zone 4 of the rotating sorption bed. The regeneration air comes into the desorption zone through the regeneration air heater outlet duct 34 and exits the zone through the desorption zone outlet duct 38.

Figure 9:
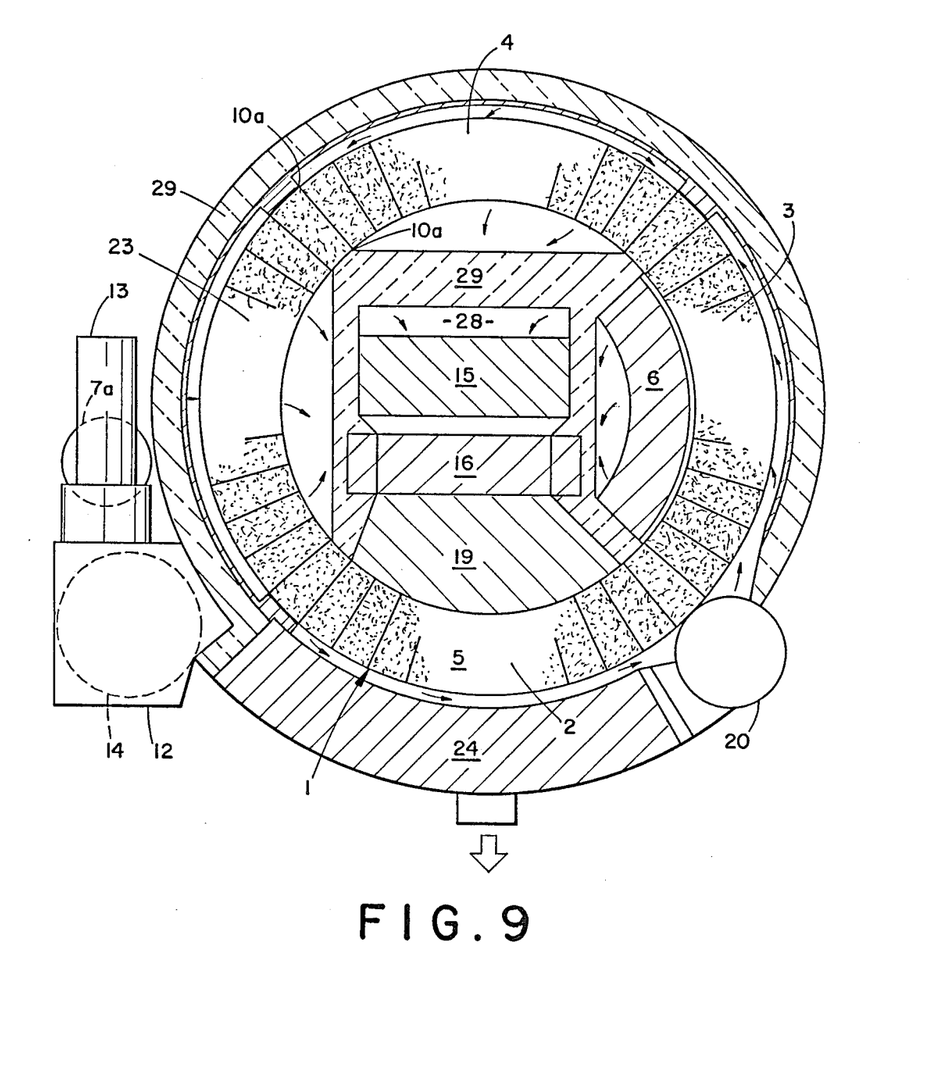
FIG. 9 is a top view general cross-section of a radial flow CAAPS device.

FIG. 9, which is a top view, general cross-section of the radial flow CAAPS device, better shows the design of the radial flow CAAPS. The air enters the system through the dust separator 12 and is compressed by the compressor 14. Dust is blown out of the system through the dust scavenge blower 13. The air enters the aerosol/particulate filter 15 from the compressor outlet duct 28. It enters the cooler 16 and then goes into the water separator 19. Contaminants are removed by sorbents contained in the sorption zone 2. Most of the clean air is heated to the desired crew comfort temperature by the crew compartment heater 24 and then exits the CAAPS device. A portion of the clean air is removed prior to the crew compartment heater and is directed to the regeneration air blower 20 which pressurized the regeneration air through the cooling zone 3 and the regeneration air heater 6. The regeneration air then proceeds through the desorption zone 4 and the regeneration air out of the CAAPS. Signal conditioning for the sensors and motor operated valve controllers is performed in the control/monitor instrumentation box 36 which is located under and in the interior of the axial flow CAAPS.

FIG. 5 shows a side view of the general cross-section of the axial flow CAAPS device. The arrows in FIG. 5 show the direction of the flow of air.

The compressor outlet duct 28, aerosol/particulate filter 15, cooler 16, water separator 19, sorption zone inlet manifold 8a, rotating sorption bed 1, sorption zone outlet manifold 9a, seals 10b, regeneration air blower inlet duct 32, crew compartment heater 24, control/monitor instrumentation box 36, insulation 29, desorption zone inlet manifold 9c, sorbent 5, and the desorption zone outlet manifold 8c are all shown. The bearings 37 support the weight of the rotating sorption bed 1, keep the rotating sorption bed 1 from jumping up when the vehicle goes over large bumps, and provides horizontal stability for the rotating sorption bed when the bed is being pulled to one side by the drive belt, 7c.

The drive device electric motor 7a is shown out of position. Also shown is the drive wheel 7b and a drive belt 7c. The drive belt may drive the rotating sorption bed 1 by solely utilizing friction. Alternatively, a timing belt may be utilized which would require cogs on the belt and on the exterior perimeter of the rotating sorption bed 1. However, this type of drive requires additional volume on the perimeter of the rotating sorption bed which will increase the overall volume of the device. Another alternative would be to utilize a flat band pin drive belt which has a flat band belt with periodic holes which encircle drive pins extending from the exterior perimeter of the rotating sorption bed 1.

FIG. 6 shows a top view of cross-section A—A of the axial flow CAAPS device shown in FIG. 5.

FIG. 6 shows the rotation of the sorption bed 1 through the four processing zones, sorption 2, heating 23, desorption 4, and cooling 3. It is diven by the drive motor 7a which turns the drive wheel 7b pulling the drive belt 7c which is held taut by the drive idler 7d. The figure also shows the seals 10b as they sit on the top of the rotating sorption bed and seal the inside circumference, the outside circumference, and the rotating sorption bed segment dividers 30. Also shown on the drawing is the insulation 29, the second manifold 9 extension wall which forms a housing for the rotating sorption bed, the bearings 37, and the control/monitor instrumentation 36. The top of the rotating sorption bed utilizes a first sorbent retainer screen 31a to keep granular sorbent in place. The screen may be eliminated where an immobilized bed sorbent is utilized. An immobilized bed may be composed of granular activated carbon which is held in place by melting small particles of sorbent resin and allowing them to cool thus forming a porous monolithic block of resin and carbon which may be held in place with pins and an edge sealant, and thus eliminating the need for the screen 31a. Many other techniques for making an immobilized bed are also possible and contemplates within the scope of the present invention.

FIG. 7 shows an alternative configuration for the CAAPS device utilizing radial flow. The air enters the dust separator 12 and the dust is extracted by the dust scavenge blower 13. The compressor 14 pressurizes the air and blows it through the CAAPS device. The drive device 7 is shown in the center of the figure. The major difference between the radial flow device and the axial flow device is that the air flows through the sorbent in a radial direction rather than axially through the sorbent segments. The crew compartment heater 24, regeneration air outlet duct 35, the compressor outlet duct 28, and the desorption zone outlet duct 38 are also shown.

FIG. 8 shows a cross-section schematic of the radial flow APS. The air comes in through the compressor outlet duct 28 and into the aerosol/particulate filter 15. It then proceeds to the cooler 16 and the water separator 19 into the sorption zone 2 of the rotating sorption bed 1. Most of the air then flows into the crew compartment heater 24 and is then available to the crew. A portion of the air goes into the regeneration air blower inlet duct 32 which directs the regeneration air to the regeneration air blower and then to the cooling zone. Insulation 29 separates the inlet air from the hot desorption zone 4 of the rotating sorption bed. The regeneration air comes into the desorption zone through the regeneration air heater outlet duct 34 and exits the zone through the desorption zone outlet duct 38.

FIG. 9, which is a top view, general cross-section of the radial flow CAAPS device, better shows the design of the radial flow CAAPS. The air enters the system through the dust separator 12 and is compressed by the compressor 14. Dust is blown out of the system through the dust scavenge blower 13. Th air enters the aerosol/particulate filter 15 from the compressor outlet duct 28. It enters the cooler 16 and then goes into the water separator 19. Contaminants are removed by sorbents contained in the sorption zone 2. Most of the clean air is heated to the desired crew comfort temperature by the crew compartment heater 24 and then exits the CAAPS device. A portion of the clean air is removed prior to the crew compartment heater and is directed to the regeneration air blower 2 which pressurized the regeneration air through the cooling zone 3 and the regeneration air heater 6. The regeneration air then proceeds through the desorption zone 4 and the heating zone 23.

The aforementioned zones are separated by sealing zones 10a. Insulation 29 is utilized to maintain the system temperatures. The rotating sorption bed is rotated by a drive device electric motor 7a.

The sorption bed 1 described in any of the above specific embodiments may contain a single sorbent material or mixed sorbents. A mixture of two or more sorbent materials may be utilized depending on the fluids to be treated and the particular contaminants to be removed or separated from the fluid. The mixed sorbent may be added to the sorption bed in a homogenous mixture or the different sorbents may be stratified within the bed. The stratification of sorbents may allow for the sorption of a particular contaminant that may otherwise clog or block the second sorbent material such that other contaminants would not be effectively separated from the fluid stream.

While the invention has been described and illustrated with reference to certain preferred embodiments thereof, those skilled in the art will appreciate that various changes, modifications and substitutions may be made therein without departing from the spirit of the invention. For example, the system and process may be utilized with most fluid mixtures that contain contaminated components that require separation from the fluid. Also, the apparatus of the present invention may include multiple sorption beds for treating single or multiple fluid streams. It is intended, therefore, that the invention be limited only by the scope of the claims which follow.

We claim:

1. A continuous sorber device for separating components of a fluid mixture comprising:
   (a) at least one rotatable sorption bed comprising sorption material, at least three processing zones and drive means for said sorption bed;
   (b) fluid inlet means communicating with said sorption bed;
   (c) a first manifold communicating with said sorption bed, said manifold having separate compartments comprising means for each of said processing zones for passing fluid from one processing zone to the next;
   (d) a second manifold communicating with said sorption bed on the side opposite to said first manifold, and said second manifold having separate compartments, said compartments comprising means for each of said processing zones for passing fluid from one processing zone to the next;
   (e) sealing means between said sorption bed and each of said first and second manifolds for sealing each of said manifold compartments to prevent fluid flow into another compartment through said sorption material within any one of said processing zones or between said manifold compartments;
   (f) fluid outlet means communicating with said sorption bed for removal of fluid separated from said components, wherein a regeneration portion of said separated fluid is diverted to pass through the remaining processing zones of said bed;
   (g) heater means communicating with said sorption bed to heat said regeneration portion of separated fluid to desorb and regenerate said sorption material; and
   wherein said three processing zones comprise:
   (1) a sorption zone,
   (2) a cooling zone, and
   (3) a desorption zone.

2. The sorber device according to claim 1 wherein said sorbent material is a solid particulate held in place by retainer screens.

3. The sorber device according to claim 1 wherein said sorbent material is a solid, porous monolithic block.

4. The sorber device according to claim 1 wherein said device is constructed and arranged to provide conditioning means for the pre-treatment of a gas.

5. The sorber device according to claim 4 wherein said device further comprises a gas conditioning means located between said fluid inlet means and said sorption bed.

6. The sorber device according to claim 5 wherein said gas conditioning means comprises:
   (a) a dust separator;
   (b) a dust scavenge means;
   (c) a compressor;
   (d) an aerosol/particulate filter;
   (e) cooling means;
   (f) a temperature sensing means for controlling the gas temperature; and,
   (g) water separation means.

7. The sorber device according to claim 6 wherein said aerosol/particulate filter is downstream of said sorption bed.

8. The sorber device according to claim 4 wherein said sorption material is a solid material capable of separation of components contained within said gas.

9. The sorber device according to claim 8 wherein said device is constructed and arranged to provide conditioning means for the pre-treatment of a gas wherein said gas is air and said components to be separated are toxic to humans.

10. A sorber device according to claim 9 wherein said device is constructed and arranged to provide conditioning means for the pre-treatment of a gas wherein said gas is air and said toxic components are the active agents of chemical warfare gases.

11. A sorber device according to claim 9 wherein said device is constructed and arranged to provide conditioning means for the pre-treatment of a gas wherein said gas is air and said toxic components are air pollutants.

12. The sorber device according to claim 8 wherein said sorption means is selected from the group consisting of silica gels, solid amines, molecular sieves, zeolites, and activated carbon.

13. The sorber device according to claim 12 wherein said sorption means is activated carbon.

14. The sorber device according to claim 1 wherein said sorbent bed is subdivided into segments by segment dividers.

15. The sorber device according to claim 14 wherein said device is constructed and arranged to provide the indexed rotation of said sorption bed and the rate of indexing is dependent upon the number of segments into which the bed is subdivided.

16. A sorber device according to claim 1 wherein said device is constructed and arranged for the treatment of a liquid and wherein said sorbent bed comprises sorptive material for the treatment of a liquid and said material is selected from the group consisting of ion exchange resins, clay materials, diatomaceous earth, sand, activated carbon, zeolites, molecular sieves, silica gels, alumina, Fuller's earth, metal carbonates and mixtures thereof.

17. A sorber device according to claim 16 wherein said device is constructed and arranged for the treatment of a liquid and said liquid is water.

18. The sorber device according to claim 17 wherein said sorption material is a solid material capable of separating dissolved, suspended, and mixed components from said water.

19. The sorber device according to claim 18 wherein said sorption material is an ion exchange resin.

20. The sorber device according to claim 1 wherein said sorbent bed is carried on bearings.

21. The sorber device according to claim 1 wherein said device is constructed and arranged to provide axial fluid flow through said sorption bed.

22. The sorber device according to claim 1 wherein said device is constructed and arranged to provide radial fluid flow through said sorption bed.

23. The sorber device according to claim 22 wherein a mixture of sorption materials are used in said sorption bed.

24. The sorber device according to claim 1 wherein said sorption bed comprises an additional heating zone for processing said fluids.

25. The sorber device according to claim 1 wherein said device is constructed and arranged for treating fluid mixtures exiting, entering, or within a building.

26. The sorber device according to claim 1 wherein said device is constructed and arranged for use in a vehicle.

27. The sorber device according to claim 1 wherein said device is constructed and arranged to provide the regeneration portion of said separated fluid and said regeneration portion of separated fluid is about 3% to about 50% of separated fluid exiting said sorption zone of said sorption bed.

28. A sorber device according to claim 27 wherein said device is constructed and arranged to provide the regeneration portion of said separated fluid and said regeneration portion of separated fluid is about 5% to about 30% of the separated fluid exiting said sorption zone of said sorption bed.

29. The sorber device according to claim 27 wherein said regeneration portion of separated fluid is diverted by a restriction means in said fluid outlet means or by a pump, blower or compressor.

30. The sorber device according to claim 1 wherein a mixture of sorption materials are used in said sorption bed.

31. A method for the continuous separation of components from a fluid mixture comprising:
  (a) introducing said fluid mixture into a sorption zone of a rotating sorption bed comprising at least one sorption material;
  (b) withdrawing separated fluid from said sorption zone into an outlet means wherein a regeneration portion of said separated fluid is diverted into a cooling zone of said rotating sorption bed;
  (c) said regeneration portion of separated fluid exits said cooling zone, enters regeneration heating means and is heated to the regeneration temperature of said sorption material; and,
  (d) said heated regeneration portion of separated fluid is introduced to a desorption zone of said rotating sorption bed to regenerate said sorption material.

32. The method according to claim 31 wherein said fluid flows axially through said sorption bed.

33. The method according to claim 31 wherein said fluid flows radially through said sorption bed.

34. The method according to claim 31 wherein said regeneration portion of separated fluid is further introduced to a heating zone of said rotating sorption bed.

35. The method according to claim 31 wherein said sorption material is solid particulate held in place by retainer screens.

36. The method according to claim 31 wherein said sorption material is a solid, porous monolithic block.

37. The method according to claim 31 wherein said fluid is a gas.

38. The method according to claim 37 wherein said gas is first introduced to a conditioning means before entering said rotating sorption bed.

39. The method according to claim 38 wherein said gas conditioning means comprises:
  (a) a dust separator;
  (b) a dust scavenge means;
  (c) a compressor;
  (d) an aerosol/particulate filter;
  (e) cooling means;
  (f) a temperature sensing means for controlling the gas temperature; and
  (g) water separation means.

40. The method according to claim 39 wherein said gas is air and said components are toxic to humans.

41. The method according to claim 40 wherein said toxic components are the active agents of chemical warfare gases.

42. The method according to claim 40 wherein said toxic components are air pollutants.

43. The method according to claim 39 wherein said sorption material is selected from the group consisting of silica gels, solid amines, molecular sieves, zeolites and activated carbon.

44. The method according to claim 43 wherein said sorption material is activated carbon.

45. The method according to claim 39 wherein said aerosol/particulate filter is located downstream of said sorption bed.

46. The method according to claim 31 wherein said fluid is a liquid.

47. The method according to claim 46 wherein said liquid is water.

48. The method according to claim 47 wherein said sorption material is a solid material capable of separating dissolved, suspended, and mixed components from said water.

49. The method according to claim 48 wherein said sorption material is an ion exchange resin.

50. The method according to claim 46 wherein said liquid is organic and said sorption material is capable of separating dissolved, suspended and mixed components from said organic liquid.

51. The method according to claim 31 wherein said fluid mixture is a fluid mixture which enters a building.

52. The method according to claim 31 wherein said fluid mixture is a fluid mixture which enters a vehicle.

53. The method according to claim 31 wherein said sorption bed is subdivided into segments by segment dividers.

54. The method according to claim 31 wherein said regeneration portion of separated fluid is about 3% to about 50% of separated fluid exiting said sorption zone of said sorption bed.

55. The method according to claim 54 wherein said regeneration portion of separated fluid is about 5% to about 30% of the separated fluid exiting said sorption zone of said sorption bed.

56. The method according to claim 31 wherein a mixture of sorption materials are used in said sorption bed.

57. The method according to claim 31 wherein at least two different sorption materials are stratified in said sorption bed.

58. A continuous sorber device for separating components of a gaseous mixture comprising:
(a) at least one rotatable sorption bed comprising sorption material, at least three processing zones and drive means for said sorption bed;
(b) fluid inlet means communicating with said sorption bed;
(c) a first manifold communicating with said sorption bed, said manifold having separate compartments comprising means for each of said processing zones for passing fluid from one processing zone to the next;
(d) a second manifold communicating with said sorption bed on the side opposite to said first manifold, and said second manifold having separate compartments, said compartments comprising means for each of said processing zones for passing fluid from one processing zone to the next;
(e) sealing means between said sorption bed and each of said first and second manifolds for sealing each of said manifold compartments to prevent fluid flow into another compartment through said sorption material within any one of said processing zones or between said manifold compartments;
(f) fluid outlet means communicating with said sorption bed for removal of fluid separated from said components, wherein a regeneration portion of said separated fluid is diverted to pass through the remaining processing zones of said bed;
(g) heater means communicating with said sorption bed to heat said regeneration portion of separated fluid to desorb and regenerate said sorption material; and,
wherein said three processing zones comprise:
(1) a sorption zone,
(2) a cooling zone, and
(3) a desorption zone; and
wherein said sorber device further comprises a gas conditioning means comprising:
(a) a dust separator;
(b) a dust scavenge means;
(c) a compressor;
(d) an aerosol/particulate filter;
(e) cooling means;
(f) a temperature sensing means for controlling the gas temperature; and,
(g) water separation means.

59. The sorber device according to claim 58 wherein said device is constructed and arranged to provide conditioning means for the pre-treatment of a gas wherein said gas is air and said components to be separated are toxic to humans.

60. The sorber device according to claim 58 wherein said sorption means is activated carbon.

61. A sorber device according to claim 58 wherein said device is constructed and arranged to provide conditioning means for the pre-treatment of a gas and said toxic components are the active agents of chemical warfare gases.

62. The sorber device according to claim 58 wherein said aerosol/particulate filter is downstream of said sorption bed.

63. The sorber device according to claim 58 wherein a mixture of sorption materials are used in said sorption bed.

64. The method according to claim 58 wherein at least two different sorption materials are stratified in said sorption bed.

* * * * *